United States Patent Office

3,005,773
Patented Oct. 24, 1961

3,005,773
AQUEOUS DRILLING FLUID
Robert B. Allred, Beaumont, Tex., assignor to Sun Oil Company, Philadelphia, Pa., a corporation of New Jersey
No Drawing. Filed Apr. 11, 1958, Ser. No. 727,803
10 Claims. (Cl. 252—8.5)

This invention relates to the drilling of oil or gas wells and more particularly relates to improved aqueous drilling fluids of a type containing alkaline earth metal components and which are resistant to thickening under high temperature well conditions. The invention also relates to improved clay dispersing agents for use in such drilling fluids.

In drilling oil or gas wells by the rotary method it is known to use drilling fluids which comprise an aqueous dispersion of a hydratable clay that has been converted to the calcium form by treatment with a calcium compound such as lime or calcium chloride and which contains a dispersant for the clay particles. Dispersants which are suitable for this purpose are the lignosulfonates, such as described in Barnes United States Patent No. 2,491,436, and tannin extracts of which the most commonly used is quebracho. In order for these materials to function properly in the drilling mud, it is generally necessary that caustic soda be present in addition to the lime. Usually the amounts of these components incorporated in the mud composition are within the ranges of 1–15 pounds per barrel of the calcium compound, 1–10 lbs./bbl. of the dispersant and 0.2–4 lbs./bbl. of caustic soda.

The foregoing type of drilling mud known as calcium-treated or calcium base mud has certain advantages over the more common sodium base type, particularly in being more resistant to contamination by calcareous contaminants such as limestone, anhydrite, gypsum and cement. When drilling through calcium-containing materials such as these with a sodium base mud, the presence of calcium ions causes the clay to be converted by ion exchange to a form higher in calcium ion content, as a result of which the viscosity and gelation characteristics of the mud may increase to such extent as to cause difficulties in further drilling. It is customary practice to treat the mud in such case with a viscosity controlling agent, such as various phosphate compounds, quebracho, lignin, tannin and the like, which acts as a dispersant for the clay particles. This treatment, however, is not always effective for controlling or regulating the viscosity and gelation characteristics of the mud to the desired levels. Accordingly, it often is best to convert the mud purposely to the calcium form in the manner described above, so that its viscosity and gelation properties will remain more stable in the presence of contaminating calcareous materials.

While muds treated with calcium compounds offer various advantages over ordinary drilling muds, it has been found that they have a tendency to undergo gelation and increase in viscosity when subjected to high temperature well conditions. This thickening effect generally does not occur at temperatures below 200° F. If the mud is subjected to higher temperatures, however, an inordinate increase in viscosity may occur. Such thickening of the drilling mud may take place during the course of drilling deep wells wherein temperatures upon to 350° F. or higher may be encountered. In some instances where the drilling operation has been stopped and the mud has been allowed to stand quiescent in the borehole for a time, it has been found that gelation of the mud occurs to such extent that it becomes no longer pumpable and may even solidify. Perkins United States Patent No. 2,491,437 describes this problem and proposes one method of alleviating it.

The present invention is directed to an improved drilling fluid composition which is resistant to thickening under well conditions. It has now been found that an especially good clay dispersant can be obtained by subjecting an aqueous mixture of pyrogallol (1,2,3-trihydroxybenzene) and an alkali metal hydroxide to heat treatment in the presence of iron. The heat treated product when incorporated in a drilling mud treated with an alkaline earth metal compound is particularly effective in controlling the viscosity and gelation characteristics of the mud before it is subjected to high temperature and in inhibiting thickening of the mud after high temperature well conditions are encountered.

According to the invention an improved aqueous drilling fluid is provided which comprises a hydratable clay, an alkaline earth metal compound and a clay dispersant obtained by heat treating an aqueous mixture of pyrogallol and an alkali metal hydroxide in the presence of iron. The clay employed can be of any of the types of hydratable clays heretofore used in drilling muds, such as bentonite, illite or native clays. The alkaline earth metal compound should be one which has a solubility in plain water at least as much as the solubility of lime. Preferably, a calcium compound is used such as lime or calcium chloride, but compounds or other alkaline earth metals, such as barium, strontium and magnesium can also be employed. The amount of lime or other alkaline earth metal compound incorporated in the mixture generally should fall within the range of 1–15 lbs./bbl. of drilling fluid. The amount of the heat treated clay dispersant added should be sufficient to inhibit thickening of the mixture under high temperature well conditions, and such amount generally will be in the range of 1–15 lbs. (on a dry basis) per bbl. of drilling fluid.

In preparing the clay dispersant according to the invention an aqueous mixture of pyrogallol and alkali metal hydroxide, preferably caustic soda, is subjected to heat under pressure and in the presence of iron for sufficient time to secure the desired dispersant characteristics. The molar ratio of caustic soda to pyrogallol preferably should exceed 1:1 and more preferably should be in the range of 2:1 to 4:1. The heat treating conditions are important for attaining the desired dispersant quality and it is essential that the mixture be maintained at a temperature of at least 225° F. for a time of at least 1 hour and more preferably at least 5 hours. A generally useful temperature range for the heat treating step is 250–400° F. As the temperature of treatment is increased within this range, maximum dispersing quality of the product can be secured with shorter heating times. For example, at 250° F. a time of 20 hours may be required to attain the best dispersing quality, whereas at 350° F. the same quality product can be obtained in less than 10 hours. As a general rule, little if any further improvement in product quality results by conducting the heat treatment beyond a time of 20 hours, although considerably longer heating periods can be used without adversely affecting the characteristics of the product.

The above-described heat treating step must be carried out in the presence of iron in order to obtain the desired dispersant qualities in the heat treated product. The iron can be present either in the form of metallic iron or as an iron compound, e.g. iron oxide. In using metallic iron the heat treating can be effectively carried out merely by heating the pyrogallol-alkali metal hydroxide solution in a steel container, or it can be done by having pieces of the metal, such as iron shavings or strips, in contact with the solution. In using an iron compound, such as iron oxide, in place of metallic iron, it is only necessary to have some of the compound in contact with or dissolved in the solution. In any event the presence of iron during the heating step appears to be necessary for securing the desired dispersant characteristics. Tests have shown that similar results cannot be obtained by employing other metals, such as nickel and chromium, in place of iron. The iron present during the heat treatment undergoes reaction to some extent, and the resultant product contains a minor amount of iron. For example, heat treating a solution composed of 25.6% pyrogallol, 24.4% sodium hydroxide and 50% water in a steel bomb at 350° F. for 20 hours yields an aqueous product which typically contains about 4.8% iron.

The aqueous product resulting from the above-described heat treatment can be added in its liquid form to drilling mud or can be dried first by evaporation of its water content to convert the dispersant into solid form. In the latter case it is desirable to admix the dispersant, either before or after evaporation of the water, with a granular filler material such as calcium carbonate, clay, barytes, talc or finely divided graphite, and grind the solid product to obtain a freely flowable powder. The dispersant in this form can conveniently be transported and handled at the well site in conventional manner.

The following examples, in which percentages are by weight, illustrate conditions for practicing the present invention and advantages derived therefrom:

*Example I*

The present example illustrates the effect of temperature in preparing dispersants according to the invention. A set of dispersant products was prepared by heat treating samples of an aqueous mixture of pyrogallol and caustic soda in a steel bomb at different temperature levels for a period of 20 hours. The starting mixture contained caustic soda and pyrogallol in a 3:1 ratio and was composed of 25.6% pyrogallol, 24.4% sodium hydroxide and 50% water. The heat treated aqueous products were added to samples of a lime-treated mud in amount of 8 lbs./bbl., the mud having been prepared by dispersing 7% bentonite (Aquagel) in water and adding lime in amount of 5 lbs./bbl. Samples of the resulting mud compositions were heated to 350° F. and maintained at this temperature level for 65 hours. Test results obtained for the mud compositions both before and after heating are shown in the following tabulation. For purpose of comparison, tests were obtained on a sample in which the pyrogallol-caustic soda mixture had not been subjected to heat treatment.

| Temperature Used in Preparing Dispersant | Baroid Viscosity, cp. | Instant Gel, g. | 10 Min. Gel, g. | Water Loss, c.c. |
|---|---|---|---|---|
| Unheated Muds: | | | | |
| No heat treatment | 75 | 120 | 390 | (air) |
| 150° F | 71 | 100 | 375 | (air) |
| 250° F | 8 | 0 | 25 | 9 |
| 350° F | 8 | 0 | 0 | 8 |
| Muds After Heating: | | | | |
| No heat treatment | 62 | 5 | 190 | (air) |
| 150° F | 120+ | 100 | 280 | (air) |
| 250° F | 13 | 0 | 15 | 16 |
| 350° F | 11 | 0 | 0 | 15 |

The results show that heating at a temperature of 150° F. does not improve the properties of the pyrogallol-caustic soda mixture and that a higher temperature is required. Excellent dispersive properties are secured by heating to 250° F. or higher for 20 hours. It is noteworthy that the so-treated dispersant is quite effective in reducing the water loss characteristics of the mud.

*Example II*

Another series of samples was prepared in the manner described in the preceding example except that the pyrogallol-caustic soda mixtures were heat treated for 5 hours instead of 20 hours. Results were as follows:

| Temperature Used in Preparing Dispersant | Baroid Viscosity, cp. | Instant Gel, g. | 10 Min. Gel, g. | Water Loss, c.c. |
|---|---|---|---|---|
| Unheated Muds: | | | | |
| No heat treatment | 75 | 120 | 390 | (air) |
| 250° F | 27 | 20 | 400 | 13 |
| 300° F | 19 | 0 | 350 | 13 |
| 350° F | 11 | 0 | 30 | 8 |
| 400° F | 8 | 0 | 0 | 8 |
| Muds After Heating: | | | | |
| No heat treatment | 62 | 5 | 190 | (air) |
| 250° F | 36 | 0 | 200 | 19 |
| 300° F | 19 | 0 | 150 | 18 |
| 350° F | 19 | 10 | 300 | 16 |
| 400° F | 11 | 0 | 0 | 15 |

These results show that good dispersants can be prepared by heating pyrogallol-caustic soda mixtures for 5 hours at 250° F. or higher and that the dispersing properties tend to improve as the treating temperature is increased.

*Example III*

Drilling muds prepared as in the preceding example, but utilizing pyrogallol-caustic soda mixtures which had been heat treated at 350° F. for times of 1 hour and 2½ hours had the following properties:

| | Baroid Viscosity, cp. | Instant Gel, g. | 10 Min. Gel, g. | Water Loss, c.c. |
|---|---|---|---|---|
| Unheated Muds: | | | | |
| 1 hour heat treatment | 32 | 40 | 450 | 14 |
| 2½ hour heat treatment | 19 | 2 | 270 | 13 |
| Muds After Heating: | | | | |
| 1 hour heat treatment | 41 | 0 | 200 | 18 |
| 2½ hour heat treatment | 13 | 0 | 100 | 17 |

The foregoing results show that substantial improvement of the clay dispersing properties can be obtained in relatively short heating periods such as 1–2½ hours at 350° F.

*Example IV*

Samples were prepared as described in Example I except that the ratios of caustic soda to pyrogallol were reduced to 2:1 and 1:1. The pyrogallol-caustic soda mixtures were heated for 20 hours at 350° F. Results were as follows:

| | Baroid Viscosity, cp. | Instant Gel, g. | 10 Min. Gel, g. | Water Loss, c.c. |
|---|---|---|---|---|
| Unheated Muds: | | | | |
| Ratio 2:1 | 8 | 0 | 0 | 8 |
| Ratio 1:1 | 6 | 0 | 60 | 19 |
| Muds After Heating: | | | | |
| Ratio 2:1 | 11 | 0 | 0 | 17 |
| Ratio 1:1 | 11 | 2 | 70 | 32 |

These results show that effective dispersants can be prepared utilizing caustic soda-pyrogallol ratios as low as 1:1 but that the material prepared at the ratio of 1:1 is not quite as effective as those obtained when a higher ratio is used. Substantial dispersing properties can still be obtained when the amount of caustic soda is reduced below a 1:1 ratio.

*Example V*

The present example illustrates the preparation and use of the dispersant in the form of a powder. A 50% aqueous mixture of caustic soda and pyrogallol in a molar ratio of 3:1 was heat treated in a steel bomb at 350° F. for 65 hours. One portion of the heat treated mixture was admixed with an equal weight of illite clay and evaporated to dryness. Another portion was admixed with calcium carbonate in a weight ratio of 5:1 and then evaporated. Each of the dried products was ground to yield a powder and then was added to a sample of drilling mud prepared as described in Example I. The illite-containing material was added in amount of 14 lbs./bbl. while the calcium carbonate-containing product was added in amount of 6 lbs./bbl. in order to have the same proportions of heat treated dispersant in the two compositions. Tests before and after heating the resulting mud compositions to 350° F. for 65 hours were as follows:

| Filler | Baroid Viscosity, cp. | Instant Gel, g. | 10 Min. Gel, g. | Water Loss, c.c. |
|---|---|---|---|---|
| Unheated Muds: | | | | |
| Illite | 11 | 0 | 15 | 8 |
| CaCO₃ | 8 | 0 | 0 | 10 |
| Muds After Heating: | | | | |
| Illite | 11 | 0 | 0 | 17 |
| CaCO₃ | 11 | 0 | 0 | 15 |

These results show that the dispersing agent can be prepared and used effectively in the form of a powder.

*Example VI*

A drilling mud was prepared by adding to a 7% dispersion of bentonite in water 2 lbs./bbl. of lime, 1 lb./bbl. of $CaCl_2 \cdot H_2O$ and 8 lbs./bbl. of pyrogallol-caustic soda solution (described in Example I) which had been heat treated in a steel bomb at 350° F. for 20 hours. Tests of the resulting mud composition before and after heating at 350° F. for 65 hours were as follows:

| | Baroid Viscosity, cp. | Instant Gel, g. | 10 Min. Gel, g. | Water Loss, c.c. |
|---|---|---|---|---|
| Unheated Mud | 8 | 0 | 0 | 10 |
| Heated Mud | 17 | 0 | 70 | 17 |

These results show that a calcium chloride-containing mud is prevented from thickening excessively by means of heat treated pyrogallol-caustic sida dispersant of the present invention.

*Example VII*

This example compares the effectiveness of the present dispersant with calcium lignosulfonate (a well known commercial dispersant) for preventing heat-thickening of a natural field mud after treatment with lime. One sample of field mud containing clays naturally encountered in drilling was treated with 5 lbs./bbl. of lime and 11.6 lbs./bbl. of pyrogallol-caustic soda solution. The latter had been heat treated in a steel bomb at a temperature of 350° F. for 65 hours. For comparison, another sample of the field mud was treated with 5 lbs./bbl. of lime, 4 lbs./bbl. of commercial calcium lignosulfonate and 1 lb./bbl. of caustic soda. Each sample of mud was heated for 65 hours at 350° F. The resulting mixtures are designated as Samples A and B, respectively. Tests before and after heating were as follows:

| | Baroid Viscosity, cp. | Instant Gel, g. | 10 Min. Gel, g. | Water Loss, c.c. |
|---|---|---|---|---|
| Unheated Muds: | | | | |
| Sample A | 3 | 0 | 0 | 5 |
| Sample B | 3 | 0 | 0 | 17 |
| Heated Muds: | | | | |
| Sample A | 7 | 0 | 0 | 32 |
| Sample B | 120+ | 200 | 220 | (air) |

These results show that the present dispersant is considerably more effective than commercial calcium lignosulfonate in preventing heat-thickening of a limed field mud.

*Example VIII*

The present example illustrates the importance of conducting the heat treating step in the presence of iron. Two samples of pyrogallol-caustic soda solution, having the composition specified in Example I, were held in "Teflon" beakers placed inside bronze bombs and were heated for 20 hours at 350° F. One of the beakers contained an iron coupon in contact with the sample while the other contained none. The heat treated aqueous products were added to samples of a lime-treated mud and the resulting compositions were heated at 350° F. for 65 hours, all as described in Example I. Results were as follows:

| | Baroid Viscosity, cp. | Instant Gel, g. | 10 Min. Gel, g. | Water Loss, c.c. |
|---|---|---|---|---|
| Unheated Muds: | | | | |
| Iron present | 10 | 0 | 0 | 10 |
| Iron not present | 45 | 70 | 250 | (air) |
| Muds after heating: | | | | |
| Iron present | 19 | 0 | 5 | 12 |
| Iron not present | 88 | 30 | 150 | (air) |

These results show that the sample which was heated in the presence of the iron coupon had considerably more effective dispersant qualities than the other.

*Example IX*

Samples of the pyrogallol-caustic soda solution, having the composition shown in Example I, were heated in a bronze bomb for 20 hours at 350° F. in the presence of varying amounts of ferric oxide. The heat treated materials were added to portions of lime-treated mud prepared as in Example I, and the resulting compositions were heated at 350° F. for 65 hours. The following is a comparison of the results with those obtained with the material heated in the absence of iron as described in the preceding example:

| | Baroid Viscosity, cp. | Instant Gel, g. | 10 Min. Gel, g. | Water Loss, c.c. |
|---|---|---|---|---|
| Unheated Muds: | | | | |
| No iron | 45 | 70 | 250 | (air) |
| 0.23 lb./bbl. Fe₂O₃ | 19 | 0 | 280 | 9 |
| 0.46 lb./bbl. Fe₂O₃ | 11 | 0 | 0 | 8 |
| 0.92 lb./bbl. Fe₂O₃ | 10 | 0 | 0 | 9 |
| Heated Muds: | | | | |
| No iron | 88 | 30 | 150 | (air) |
| 0.23 lb./bbl. Fe₂O₃ | 19 | 0 | 100 | 13 |
| 0.46 lb./bbl. Fe₂O₃ | 21 | 0 | 50 | 14 |
| 0.92 lb./bbl. Fe₂O₃ | 17 | 0 | 20 | 14 |

These results show that the presence of iron oxide during heat treatment of the pyrogallol-caustic soda solution effectively aids in securing improved dispersant characteristics.

It should be noted that other trihydroxybenzenes are not suitable for preparing clay dispersants in the manner in which pyrogallol is used in practicing the present invention. For example, it was found that when a mixture of caustic soda and phloroglucinol (1,3,5-trihydroxybenzene)—an isomer of pyrogallol—was heat treated in a steel bomb at 350° F. for 20 hours, substantially no clay dispersant properties were developed.

I claim:

1. An aqueous drilling fluid having improved resistance to thickening under high temperature well conditions which comprises an aqueous dispersion of a hydratable clay, 1-15 lbs./bbl. of an alkaline earth metal compound having water solubility at least as much as that of lime and a clay dispersant obtained prior to incorporation in the drilling fluid by heat treating an aqueous mixture of pyrogallol and at least an equivalent molar amount of an alkali metal hydroxide in the presence of iron at a temperature of at least 225° F. for a time of at least 1 hour, said dispersant being present in amount sufficient to inhibit thickening of the mixture under high temperature well conditions.

2. A drilling fluid according to claim 1 wherein said alkaline earth metal compound is lime.

3. An aqueous drilling fluid having improved resistance to thickening under high temperature well conditions which comprises an aqueous dispersion of a hydratable clay, 1–15 lbs./bbl. of lime and a clay dispersant in a dry basis amount of 1–15 lbs./bbl., said dispersant having been obtained prior to incorporation in the drilling fluid by heat treating an aqueous mixture of pyrogallol and at least an equivalent molar amount of caustic soda in the presence of iron at a temperature of at least 225° F. for a time of at least 1 hour.

4. A drilling fluid according to claim 3 wherein the temperature of heat treating was in the range of 250–400° F. and the time of heat treating was at least 5 hours.

5. A drilling fluid according to claim 4 wherein said aqueous mixture comprises caustic soda and pyrogallol in a molar ratio of at least 2 to 1.

6. A clay dispersant for use in drilling muds comprising a powdery admixture of a filler and the solid product obtained by heat treating an aqueous mixture of pyrogallol and at least an equivalent molar amount of an alkali metal hydroxide in the presence of iron at a temperature of at least 225° F. for a time of at least 1 hour and then evaporating.

7. A dispersant according to claim 6 wherein the filler is a clay.

8. A dispersant according to claim 6 wherein the filler is calcium carbonate.

9. A clay dispersant for use in drilling muds comprising a powdery admixture of a filler and the solid product obtained by heat treating an aqueous mixture of caustic soda and pyrogallol in a molar ratio of at least 2:1 in the presence of iron at a temperature within the range of 250–400° F. for a time of at least 5 hours and then evaporating.

10. A clay dispersant for use in drilling muds comprising the product obtained by heat treating an aqueous mixture, in which the components other than water consist essentially of an alkali metal hydroxide and pyrogallol in a molar ratio of at least 2:1, in the presence of iron at a temperature within the range of 250–400° F. for a time of at least 5 hours.

References Cited in the file of this patent

UNITED STATES PATENTS

| | | |
|---|---|---|
| 2,109,858 | Cannon | Mar. 1, 1938 |
| 2,491,436 | Barnes | Dec. 13, 1949 |
| 2,650,196 | Rahn | Aug. 25, 1953 |
| 2,771,420 | Rowe | Nov. 20, 1956 |
| 2,783,122 | Hoekje | Feb. 26, 1957 |
| 2,802,783 | Weiss, et al. | Aug. 13, 1957 |

FOREIGN PATENTS

| | | |
|---|---|---|
| 1,122,602 | France | Sept. 11, 1956 |